March 3, 1964 — G. F. HARPELL — 3,123,820
ANTENNA ROTATION ANGLE MEASURING APPARATUS
Filed Feb. 14, 1962 — 3 Sheets-Sheet 1
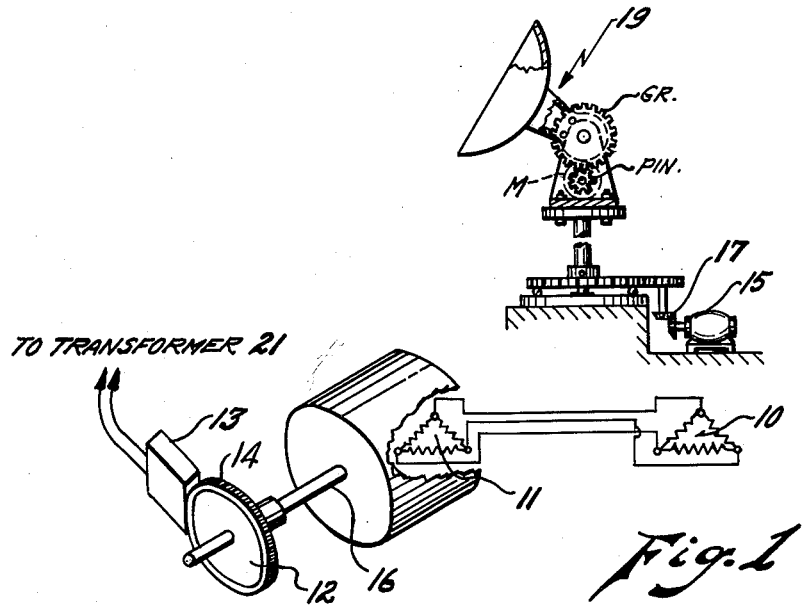
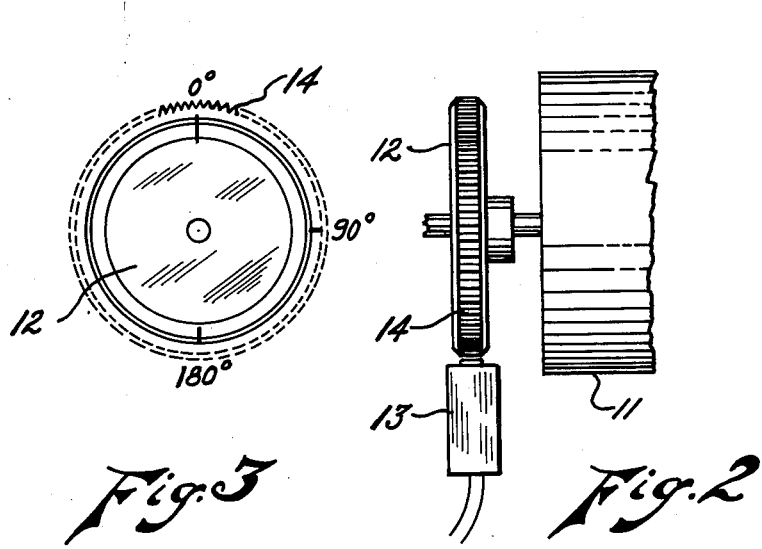
INVENTOR.
GEORGE F. HARPELL

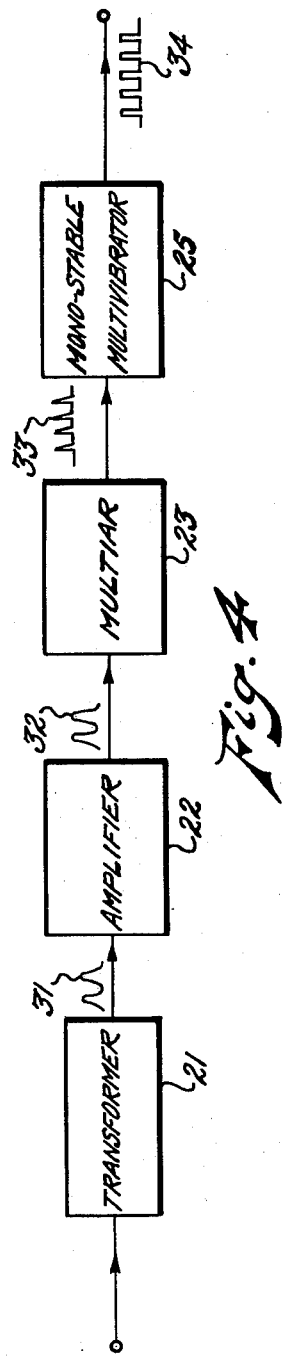
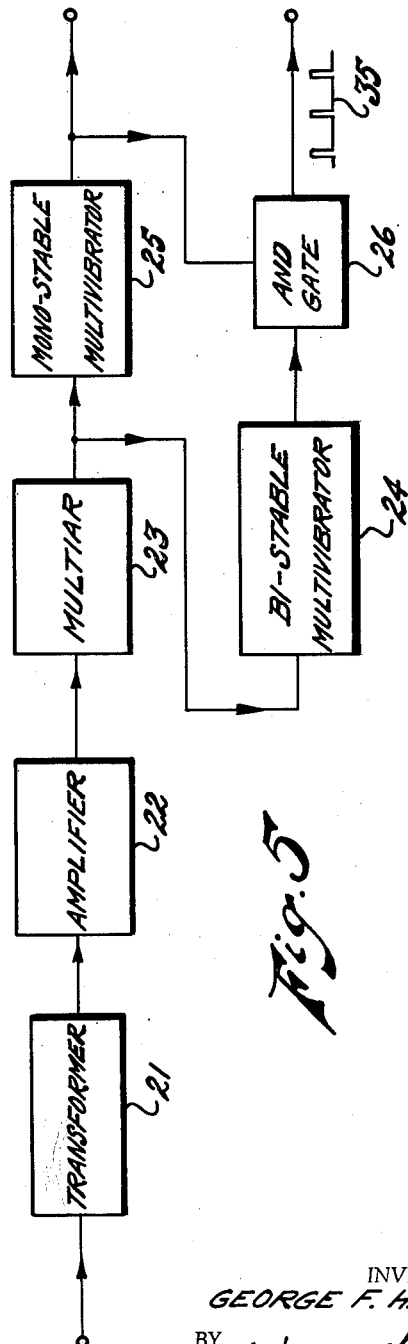

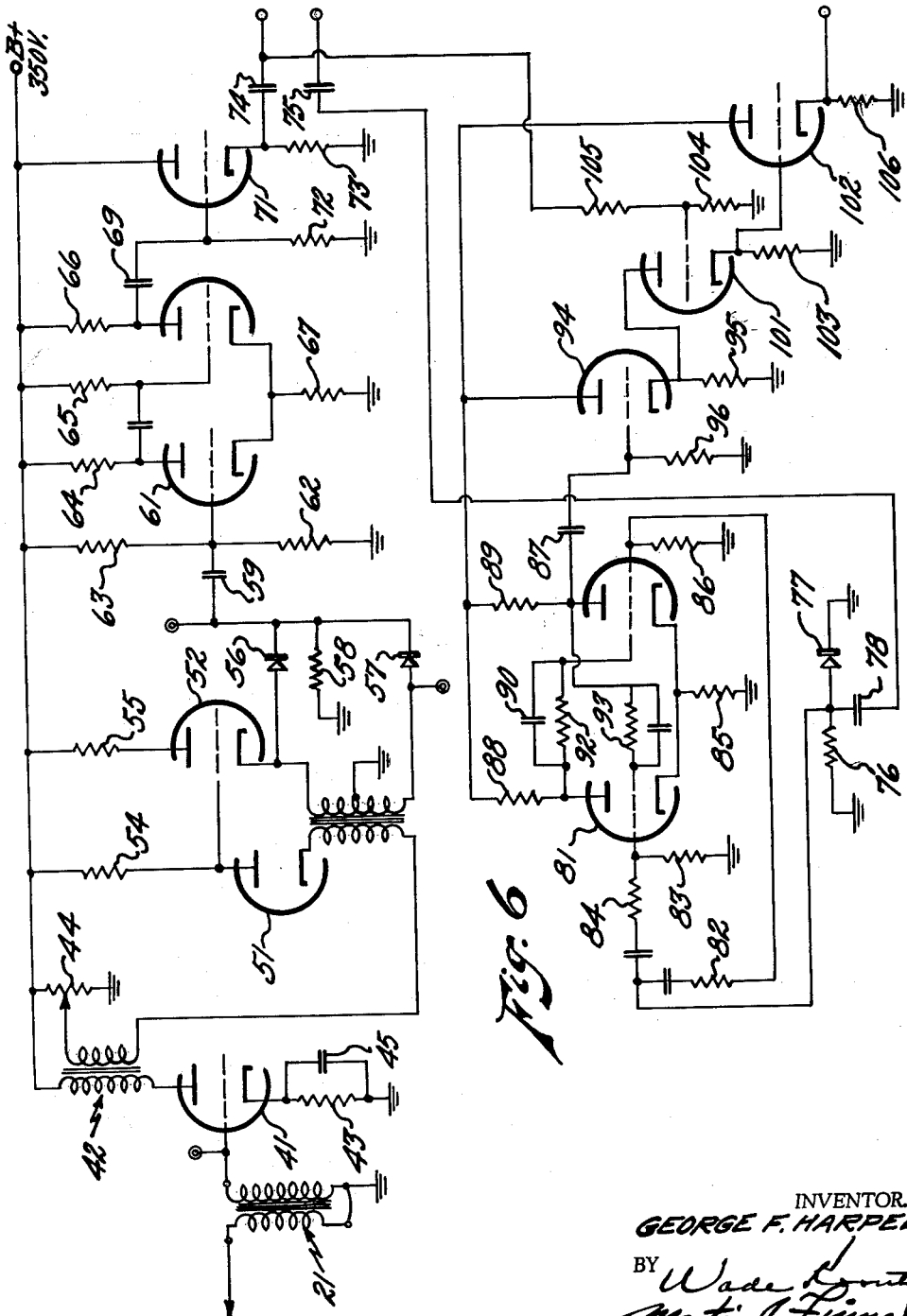

United States Patent Office 3,123,820
Patented Mar. 3, 1964

3,123,820
ANTENNA ROTATION ANGLE MEASURING
APPARATUS
George F. Harpell, Concord, Mass., assignor to the
United States of America as represented by the Secretary of the Air Force
Filed Feb. 14, 1962, Ser. No. 173,621
2 Claims. (Cl. 340—350)
(Granted under Title 35, U.S. Code (1952), sec. 266)

The invention described herein may be manufactured and used by or for the United States Government for governmental purposes without payment to me of any royalty thereon.

This invention relates to rotatable antenna used in transmitting and receiving electromagnetic waves, and more particularly to apparatus for generating an output signal responsive to the angular displacement of such an antenna.

In all radar systems which employ scanning antennas, it is necessary to provide information relating to the azimuth displacement of such an antenna. This is commonly accomplished by the use of a potentiometer that provides a voltage output proportional to the azimuth angle traversed by the antenna. This method of obtaining azimuth information, however, is relatively inaccurate and the output is not readily adaptable to use in a digital computer. Another method for orienting the radar scanning antenna is that of maintaining a critical antenna rotation speed during the scanning operation. Extensive difficulties arise when such a procedure is attempted with large antennas in the presence of any appreciable wind. There is then, a need for apparatus adapted to provide accurate antenna azimuth information in digital form under all operating conditions.

Accordingly, it is a primary object of my invention to provide new and improved apparatus for determining the angular displacement of a rotatable antenna.

It is another object of my invention to provide apparatus adapted to generate a digital signal responsive to the rotation angle of a radar antenna.

A still further object of my invention is to provide, in a scanning radar system, apparatus for providing a digital output signal comprising a pulse train, each pulse thereof representing an increment of antenna azimuth rotation.

Still another object of my invention is to provide, in a search radar system, an output signal responsive to the azimuth position of the radar antenna that is readily adaptable to use in a digital computer.

The invention itself, both as to organization and manner of operation together with further objects and advantages thereof, may be best understood by reference to the following description taken in connection with the accompanying drawings in which:

FIGURE 1 presents a pictorial view of the synchro system associated with my invention;

FIGURE 2 illustrates the signal generating apparatus associated with my invention;

FIGURE 3 is an end view of the serrated steel wheel shown in FIG. 2;

FIGURES 4 and 5 are block diagrams of the pulse-forming stages, FIG. 5 showing a modification of the FIG. 4 scheme; and FIGURE 6 is a schematic diagram of said pulse-forming stage.

Referring now to FIGURE 1, there is illustrated in connection with rotatable antenna 19 (driven by motors 15 and M) a synchro-transmitter 10 responsive to any angular rotation of said antenna 19 by gears (not shown) and is electrically connected to synchro-receiver 11. A steel wheel having a plurality of serrations 14 cut into the outer perimeter thereof is attached to axle 16 of synchro-receiver 11. In the instant embodiment of my invention there is an 18:1 ratio between synchro-transmitter 10 and synchro-receiver 11. The number of serrations along the perimeter of steel wheel 12 is contingent upon said ratio and also upon the number of increments or pulses desired to represent each degree of azimuth antenna rotation.

Referring now to FIGURES 2 and 3, there are illustrated more detailed views of steel wheel 12 and the peripheral serrations thereon. As synchro receiver 11 rotates steel wheel 12, serrations 14 induce a sine wave in magnetic pick-up 13. In the present embodiment of my invention, steel wheel 12 has 500 such serrations milled into the circumference. This number of serrations coupled with the 18:1 ratio of the synchro-system provides for the generation of a signal having a train of pulses, each pulse thereof representing .02° of antenna rotation.

Referring now to FIGURE 4, there is illustrated a block diagram of the pulse-forming stage of my invention. The output of magnetic pickup 13 is fed to transformer 21 wherein the sine waves are stepped up by about 50:1 producing the wave form illustrated by sine wave 31. Sine wave 31 is then amplified by amplifier 22 to provide amplified output sine wave 32. Amplified output sine wave 32 is then applied to multiar 23 which produces a trigger for each half cycle of sine wave 32. Multiar 23 has circuitry asosciated therewith adapted to invert the negative trigger pulses and produces an output train as illustrated by positive pulses 33. Positive pulses 33 are then fed to monostable multivibrator 25 to produce the desired pulse train output 34. Bi-stable multivibrator 24 and And-gate 26 may be used to provide a pulse train having alternate counts if such an output is desired.

A schematic diagram of this pulse-forming stage is presented in FIGURE 6. Amplifier 22 is shown to comprise triode 41 in combination with resistor 43, capacitor 45 and transformer 42. Multiar 23 includes diode 51, triode 52 in combination with transformer 53 and associated network resistors 54 and 55.

The negative pulse inverting circuitry associated with multiar 23 comprises diodes 56, 57 in combination with resistor 58. Mono-stable multivibrator 25 is of conventional design and comprises duo triode 61 in combination with resistors 64—67. Capacitors 59 and 69 provide A.-C. coupling means. The full count digital output is delivered to capacitors 74 and 75 after amplification in a cathode following amplifier stage comprising triode 71 and resistors 72 and 73.

Should an alternate count signal output be desired, the multivibrator 24 and And-gate 26 circuitry shown in FIGURE 5 may be added. Multivibrator 24, in this case, comprises duo triode 81 in combination with resistors 82—86 and 88—89, as illustrated. And-gate 26 comprises triodes 101 and 102 in combination with resistors 103—106 in the circuit already illustrated. Cathode follower 94 provides impedance matching between multivibrator 24 and And-gate 26.

While a particular embodiment of the present invention has been shown and described, it will be obvious to those skilled in the art that changes and modifications may be made without departing from this invention in its broader aspects and therefore the aim in the appended claims is to cover all such changes and modifications that fall within the true spirit and scope of this invention.

I claim:

1. In a height-finding system having a rotatable antenna, apparatus adapted to provide a digital signal responsive to antenna azimuth rotation comprising a steel wheel having a plurality of uniformly disposed serrations on the outer periphery thereof, means for rotating said wheel on the major axis thereof in response to the rotation of said antenna, a magnetic pick-up, said magnetic pick-up being proximate to the outer periphery of said steel wheel and adapted to generate an alternating signal voltage in response to any rotation thereof, a multiar, said multiar being actuated by the output of said magnetic pick-up, and a pair of multivibrators, one being of the mono-stable type, the other being of the bi-stable type, said mono-stable multivibrator being adapted to generate a digital output signal responsive to the output of said multiar.

2. In a height-finding system having a rotatable antenna, apparatus adapted to provide a digital signal responsive to antenna azimuth rotation comprising a steel wheel having a plurality of uniformly disposed serrations on the outer periphery thereof, means for rotating said wheel on the major axis thereof in response to the rotation of said antenna, a magnetic pick-up, said magnetic pick-up being proximate to the outer periphery of said steel wheel and adapted to generate an alternating signal voltage in response to any rotation thereof, a pair of multivibrators, one being of the mono-stable type, the other being of the bi-stable type, said mono-stable multivibrator being adapted to generate a digital output signal responsive to the output of said magnetic pick-up, and an And-gate, said bi-stable multivibrator being actuated by the output of said magnetic pick-up, and said And-gate being actuated by the outputs of said bi-stable multivibrator and said mono-stable multivibrator.

References Cited in the file of this patent
UNITED STATES PATENTS 3,060,427  Jaffe et al. _____ Oct. 23, 1962

OTHER REFERENCES

Pulse and Digital Circuits, by Millman and Taub, McGraw-Hill Book Co., New York, 1956 pp. 468 and 475 relied on.

Electronics, April 17, 1959, pp. 52-54.